United States Patent [19]

Moyer

[11] 4,431,215

[45] Feb. 14, 1984

[54] RISER CONNECTOR

[75] Inventor: Mark C. Moyer, Stafford, Tex.

[73] Assignee: Exxon Production Research Co., Houston, Tex.

[21] Appl. No.: 255,934

[22] Filed: Apr. 20, 1981

[51] Int. Cl.³ .............................................. F16L 35/00
[52] U.S. Cl. ..................................... 285/18; 285/308; 285/317; 285/DIG. 21
[58] Field of Search ................. 285/18, 308, DIG. 21, 285/320, 317, 309, 316

[56] References Cited

U.S. PATENT DOCUMENTS

| | | | |
|---|---|---|---|
| 2,970,445 | 2/1961 | Suderow | 285/DIG 21 X |
| 3,071,188 | 1/1963 | Raulins | 285/DIG. 21 X |
| 4,068,865 | 1/1978 | Shanks | 285/309 X |
| 4,114,928 | 9/1978 | Lochte | 285/18 |
| 4,195,865 | 4/1980 | Martin | 285/18 |
| 4,222,592 | 9/1980 | Saliger et al. | 285/18 |

*Primary Examiner*—Dave W. Arola

*Attorney, Agent, or Firm*—Alfred E. Equitz; James S. Hsue

[57] ABSTRACT

Two adjacent riser pipes having substantially a common axis are connected by the riser connector of this invention in the manner described below.

A connector box, adapted to be attached to the end of one of the pipes, has an abutment surface and adjacent to it a channel transverse to the common axis of the pipes. A locking dog fits slidably in the channel, and has a tapered surface facing the abutment surface of the box and at an angle less than 45° to the direction of the channel. A connector pin, adapted to be attached to the end of the other pipe, has a flange. When the flange is in contact with the abutment surface of the box and when the locking dog is pushed towards the flange by a force applying means, the flange of the pin is held between the tapered surface of the dog and the abutment surface of the box, and the connections between the box, pin, and dog are preloaded by forces greater in magnitude than the force applied by the force applying means.

10 Claims, 3 Drawing Figures

RISER CONNECTOR

BACKGROUND OF THE INVENTION

1. Field of the Invention

This invention relates to an apparatus for connecting sections of conduit to each other. Specifically, the invention relates to improved riser connectors for use in oil or gas wells.

2. Description of the Background Art

In oil or gas well completion systems, it is necessary to join the ends of adjacent riser pipes. Frequently this is done by means of a joint between two riser pipes commonly referred to as a riser or pipe connector. The riser connector is frequently subjected to powerful forces acting in many directions. If parts of the riser connector are not tightly fitted together, forces acting on the connector in different directions often cause internal wear in the connector, which increases the possibility of fatigue failure of the connector. To reduce looseness and internal wear in a riser connector, it is desirable to urge the connecting parts of the connector towards one another. This procedure is known as preloading.

Pipe connectors have been used in the art to connect together the ends of two pipes. In U.S. Pat. No. 4,114,928 (1978), Lochte disclosed a connector for connecting two conduits having a common axis. Lochte employs a toggle to preload the connection between the two conduits. The toggle expands to exert a force generally parallel to the common axis of the conduits, forcing one conduit towards the other, to connect the conduits and to preload the connection. The full magnitude of the preloading force is therefore transmitted through the components of the toggle. Since the typical magnitudes of preloading forces are of the order of millions of pounds, preloading forces may cause the toggle to deform and to lose its function. It is therefore desirable to design a riser connector for connecting two riser pipes which is less severely affected by such forces.

SUMMARY OF THE INVENTION

The two riser pipes to be connected are placed so that they have substantially the same central longitudinal axis. A connector box is adapted to be connected to the end of the first pipe. The box also has an abutment surface. The box defines a channel adjacent to the abutment surface, said channel having an axis so oriented that when the box is attached to the first pipe, the axis of the channel is transverse to the common axis of the pipes. A locking dog is adapted to fit slidably into the channel of the box. The dog has a tapered surface which, when the dog is in the channel, faces the abutment surface of the box and is at a wedge angle to the axis of the channel. The wedge angle is greater than 0° but less than 45°. A means for applying forces to the dog controls the movement of the dog in the channel. A connector pin is adapted to be attached to the end of the second riser pipe. The pin has a flange called a hub for engaging the abutment surface of the box and the tapered surface of the dog, so that, when the force applying means applies a force to the dog in the channel of the box pushing the dog towards the hub, the hub is held between the abutment surface of the box and the tapered surface of the dog, and so that the connections between the box, the pin, and the dog are preloaded by forces greater in magnitude than the force applied to the dog by the force applying means. The force applying means, a part of the riser connector, is therefore less severely affected by preloading since it need not exert the full magnitudes of the preloading forces required for the riser connection.

DESCRIPTION OF THE PREFERRED EMBODIMENT

The preferred embodiment of this invention for connecting the ends of the two riser pipes comprises a connector box adapted to be attached to the end of one pipe, a connector pin adapted to be attached to the end of the other pipe, a shiftable tapered locking dog, a toggle, and a toggle control mechanism. The connector box defines a chamber for housing the toggle and part of the toggle control mechanism, and also defines a channel adjacent to the chamber for housing the locking dog. The toggle and the toggle control mechanism apply forces to the locking dog for controlling the position of the dog in the channel. The box also defines an abutment surface adjacent to the channel. The abutment surface and a portion of the channel act as two clamping surfaces for clamping the connector pin. The pin has a flange called a hub which, when it abuts the abutment surface of the box, leaves a wedge shaped space between it and the clamping portion of the channel. The tapered portion of the locking dog fits snugly into this space so that, when the toggle control mechanism expands the toggle, the toggle in turn pushes the dog into this space, and the dog and hub are clamped between the two clamping surfaces of the box.

Figure 1:
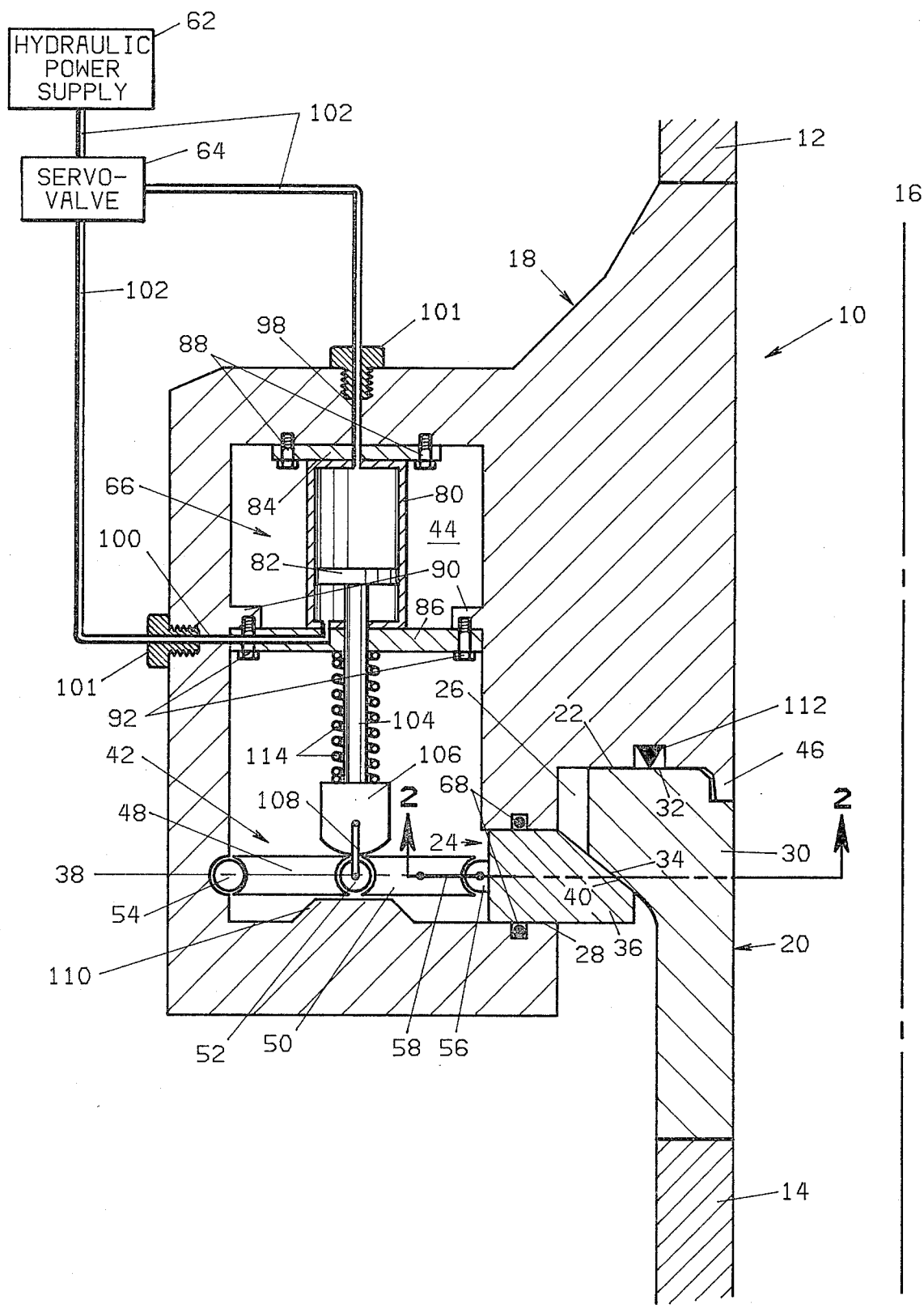
FIG. 1 is a partly schematic, partly cross-sectional and partial view of a riser connector illustrating the preferred embodiment of this invention.

FIG. 1 is a partly schematic, partly cross-sectional and partial view of a riser connector 10 illustrating the preferred embodiment of this invention. Riser connector 10 connects the end of a first riser pipe 12 to the end of a second riser pipe 14, the two riser pipes having been aligned so that they have substantially the same common central and longitudinal axis 16 and are spaced apart to allow room for connector 10. For convenience in description, the direction of the common axis 16 may be referred to as the vertical direction with riser pipe 12 located above riser pipe 14.

Riser connector 10 includes a connector box 18 and a connector pin 20 which are adapted to be attached to the ends of the two conduits 12 and 14, respectively, by a conventional process such as welding. Riser pipes 12 and 14 are then connected by joining the box 18 to pin 20. The box defines a lower abutment surface 22, and adjacent to it a channel 24 in a direction transverse to the vertical. Abutment surface 22 resides in a recess 26 adjacent to channel 24. A lower portion 28 of the surface of channel 24 together with abutment surface 22 act as two clamping surfaces. The box and pin are then connected by clamping a portion of pin 20 between the two clamping surfaces. This clamping function is accomplished by the box-pin-dog combination described below.

Pin 20 has a flange 30 called a hub which has an upper abutment surface 32. A portion of hub 30 fits into recess 26 with its abutment surface 32 adapted to contact the abutment surface 22 of the box. When the hub is in this position, the hub and clamping surface 28 of the box are separated by a wedge-shaped space. The surface of the hub across the wedge-shaped space from clamping surface 28 is surface 34. Channel 24 has longitudinal axis 38. A tapered locking dog 36 fits slidably into channel 24 and has a surface 40 which is tapered with respect to axis 38 of channel 24 in such a manner that the tapered portion of the dog fits snugly into the wedge shaped space between the hub and surface 28 with tapered surface 40 in contact with surface 34 of the hub. When locking dog 36 is pushed into this position, hub 30 is clamped between abutment surface 22 of the box and tapered surface 40 of the locking dog so that friction between the contacting surfaces of the hub with the box and with the locking dog holds the box and the pin together, in the generally horizontal direction. When tapered surface 40 of the dog is pushed against surface 34 of the hub, the force exerted by surface 40 upon the hub has a vertical component which pushes the hub against abutment surface 22 of the box. This vertical force component hold the box and pin together in the generally vertical direction. This position of the dog may be called its locking position. A means for applying forces to the dog is used to push the dog into and maintain it in the locking position to connect the box and pin, and used to withdraw the dog therefrom to disconnect the box and pin. The means for applying forces to the dog comprises a toggle 42, and a toggle control mechanism. The toggle and the toggle control mechanism will be described below.

In addition to friction, another feature of this invention assists in locking the box and the pin together. This feature comprises a flange 46 extending downwards from the box adjacent to abutment surface 22, and enclosing recess 26 from one side. Flange 46 is so positioned that a portion of hub 30 is sandwiched between the locking dog 36 and flange 46 and that this portion of hub 30 is larger than and cannot be withdrawn through the space between the locking dog and the flange, so that when the locking dog is in its locking position hub 30 is locked in place in contact with the box.

Figure 2:
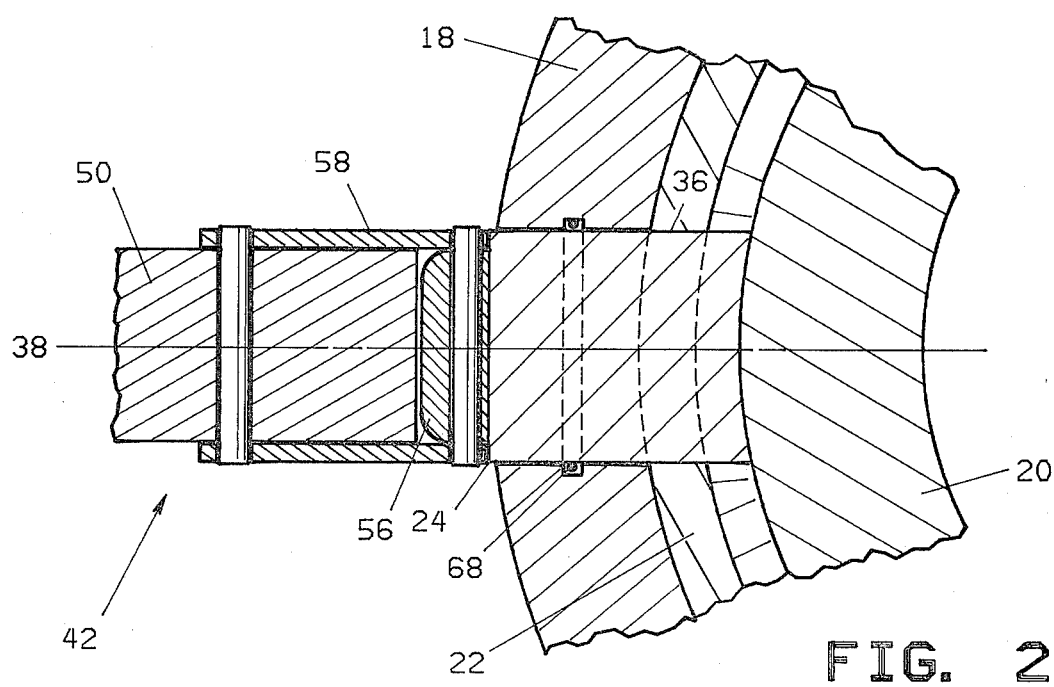
FIG. 2 is a simplified, partial cross-sectional view of the riser connector in FIG. 1, taken along line 2—2 of FIG. 1.
Figure 3:
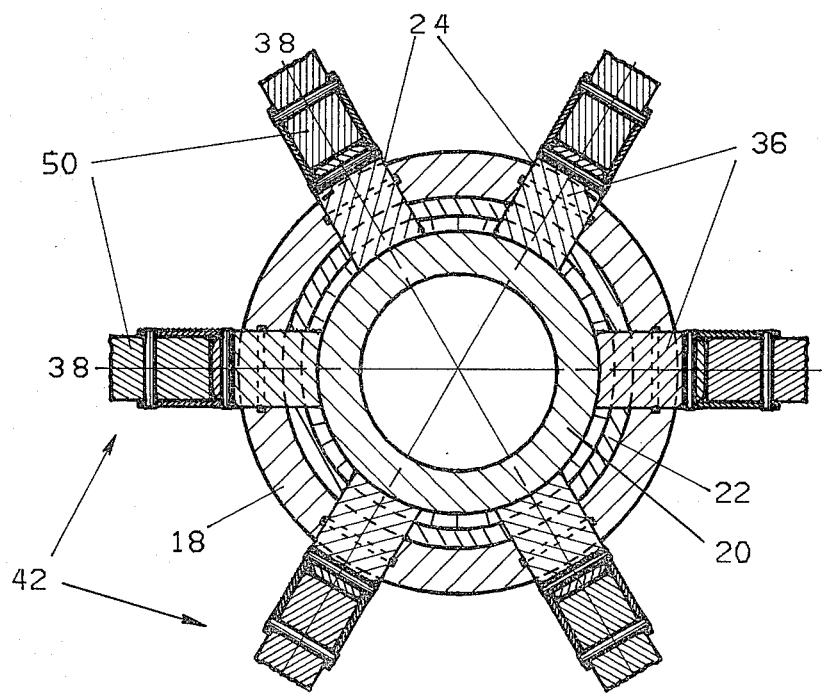
FIG. 3 is a simplified, partial cross-sectional view of the riser connector partially shown in FIG. 1, taken on the same plane as FIG. 2 and viewed along the same direction to show a larger cross-section of the connector than FIG. 2.

In the preferred embodiment, pipes 12 and 14 are cylindrical, as are the box and the pin. Abutment surfaces 22, 32 of the box and pin are annular in shape. Therefore FIG. 1 shows only one half of the cross-sectional view of the cylindrical pipes and the box and pin in the preferred embodiment, the other half being on the other side of the common axis. FIG. 2 is a simplified partial cross-sectional view of connector 10 taken along line 2—2 of FIG. 1. FIG. 3 is a simplified partial cross-sectional view of the connector partially shown in FIG. 1, taken on the same plane as FIG. 2 and viewed along the same direction to show a larger cross-section of the connector than FIG. 2. In the preferred embodiment shown in FIG. 3, the box defines a number of channels 24 disposed around a circumference of the box, each channel housing a locking dog 36. Each of the locking dogs is controlled by an individual toggle 42 and toggle controlling mechanism. Axes 38 are aligned along radii of the box. Each of the locking dogs and toggle controlling mechanisms function in a similar manner to connect the box and the pin; in the discussion that follows, the function of only one of each of the locking dogs, toggles and control mechanisms needs to be discussed. In the preferred embodiment, channels 24 and locking dogs 36 are cylindrical, and they will have circular cross sections taken on planes normal to axes 38 of the channels.

In reference to FIG. 1, when pipes 12 and 14 are used in well completion systems, they are subjected to vertical forces which are frequently quite powerful. When such vertical forces are pulling apart the box and pin, they will tend to shift locking dog 36 out of its locking position. To maintain the dog in its locking position so as to maintain the box to pin connection, the force applying means comprising toggle 42 and a toggle control mechanism must apply a locking shifting force to the dog with sufficient magnitude to counter the effects of the vertical forces on the box and pin. Ignoring friction, the mechanical advantage provided by the box-pin-dog combination, or the ratio of the magnitude of the vertical force on the box to the minimum magnitude of the locking shifting force on the dog is determined by the angle between axis 38 of channel 24 and tapered surface 40, or the wedge angle, and the angle between axis 38 and the horizontal surface, or the orientation angle. In the preferred embodiment, channel 24 is substantially horizontal and the locking shifting force on the dog acts in a substantially horizontal direction. If the wedge angle is less than 45°, the minimum magnitude of this locking shifting force is less than the magnitude of the vertical force on the box or the pin. This minimum magnitude may be expressed in terms of the wedge angle and the vertical force on the box or the pin in a conventional manner. In general, this minimum magnitude of the locking shifting force may be reduced by reducing the wedge angle. The minimum magnitude of the locking shifting force exerted by the toggle and the toggle control mechanism may be selected by choosing an appropriate wedge angle greater than 0° but less than 45°. Therefore, by reducing the wedge angle, the forces acting on the components of the toggle and toggle control mechanism are reduced in magnitudes.

If axis 38 of channel 24 is not horizontal but at an angle to the horizontal called the orientation angle, the minimum magnitude of the locking shifting force exerted by the toggle may be expressed in a conventional manner in terms of the orientation angle, the wedge angle and the vertical force on the box or the pin. The wedge angle in this case must still be greater than 0° but less than 45°. Axis 38 should be transverse to the common axis of riser pipes 12, 14. If axis 38 is parallel to such axis, the minimum locking shifting force is equal to the vertical force on the box or the pin, and the mechanical advantage of the box-pin-dog combination disappears. For a given orientation angle, there is a range of values for the wedge angle within which the minimum locking shifting force is smaller in magnitude than the vertical force on the box or the pin. In general, the larger the orientation angle, the smaller is the range of values for the wedge angle that still provides mechanical advantage. The ranges of values for the wedge angle corresponding to different orientation angles are listed in the following table:

| Orientation Angle | Wedge Angle (greater than 0° but less than 45°) |
| --- | --- |
| 0 | 0–45° |
| 10° | 0–40° |
| 30° | 0–30° |

-continued

| Orientation Angle | Wedge Angle (greater than 0° but less than 45°) |
|---|---|
| 50° | 0–20° |
| 70° | 0–10° |

If axis 38 is not horizontal, it is possible to reduce the size of the connector box 18. The dimensions of riser connector 10 may consequently be reduced, which may be desirable in some situations.

Toggle 42 may also be used to control the movement of locking dog 36 into and out of the locking position, so as to connect and disconnect the box and the pin. Toggle 42 comprises toggle links 48 and 50 with curved ends. Toggle links 48 and 50 are joined through roller 52 which fits into the curved ends of the two links. The other end of toggle link 48 is connected to the box through another roller 54 which resides in a cylindrical recess in the box. The other end of toggle link 50 is connected to the locking dog 36 through a roller connector 56 attached to the dog. Toggle link 50 is further connected to the roller connector 56 by a connecting rod 58 in a conventional manner, which allows toggle link 50 to rotate about roller connector 56 along its curved surface. From FIG. 1 and the above description, it will be seen that if roller 52 is pulled upwards, the curved ends of toggle links 48, 50 in contact with roller 52 will also be pulled upwards. Then toggle 42 contracts and connecting rod 58 pulls the roller connector 56 and the locking dog 36 attached to roller connector 56 in a generally horizontal direction to withdraw the locking dog from the locking position. The hub is no longer locked into contact with the box, and the box may be disconnected from the pin. To connect the pin to the box, roller 52 is pushed downwards. The raised ends of toggle links 48, 50 are also pushed downwards, pushing the locking dog into contact with surface 34 of the hub to lock the pin to the box.

The toggle control mechanism for controlling the expansion and contraction of the toggle comprises a hydraulic power supply 62, a servovalve 64 and a piston cylinder system 66. The toggle and piston cylinder assembly are placed in chamber 44 of the box. Chamber 44 is entirely enclosed by the box, except that it communicates with the outside through channel 24. As described above, locking dog 36 fits into channel 24, plugging the entrance to chamber 44. O-ring 68 between the contacting surfaces of the dog and the channel further seals chamber 44 from the outside, which may be oil filled to prevent rusting of the piston cylinder assembly and the toggle.

Piston cylinder assembly 66 comprises hollow cylinder 80, piston 82, and plates 84, 86. To facilitate attachment to connector box 18, hollow cylinder 80 is attached in a conventional manner to two plates 84 and 86. Plate 84 may then be attached to the connector box by screws 88. Flange 90 of the connector box protruding into chamber 44 is provided so that plate 86 may be attached to the flange by bolts 92. Piston 82 fits sealingly into the space in cylinder 80. Piston 82 divides the space in cylinder 80 into two parts which are connected to servovalve 64 and a hydraulic power supply 62, through conduits 98 and 100, hydraulic fittings 101, and hydraulic lines 102.

The servovalve and the hydraulic power supply may be used in a conventional manner to apply a selected force on piston 82 in a generally upward or downward direction to expand and contract the toggle. Piston 82 is connected to roller 52 of the toggle through piston rod 104, actuating cam 106, and cam linkage 108. When piston 82 is movong downward, the actuating cam moves downward to contact the ends of toggle links 48, 50 in contact with roller 52 and pushes the ends downward to expand the toggle. When piston 82 is moving upward, it pulls upward roller 52 and the ends of toggle links 48, 50 through piston rod 104 and cam linkage 108, thereby contracting the toggle. A portion 110 of the wall of chamber 44 adjacent to roller 52 protrudes to act as support for the roller, preventing overtravel of the roller and undesired contraction of the toggle.

A metal V-seal 112 is provided between the abutment surfaces 22 and 32 to seal the connection between the box and the pin. A spring 114 placed around piston rod 104 and in contact with plate 86 and cam 106 urges the cam downwards so that the connection between the box and the pin is maintained even if the hydraulic power supply or the servovalve should fail.

As shown above, the box-pin-dog combination provides mechanical advantage in that the locking shifting force exerted by the toggle on the dog is sufficient to counter vertical forces of greater magnitude pulling apart the box and pin. Therefore the box-pin-dog combination will provide the same mechanical advantage when the toggle exerts a shifting force on the dog which causes an axial preloading force between the abutment surfaces of the box and pin of greater magnitude than the shifting force. A conventional static calculation will demonstrate that the preloading force between the dog and the hub caused by the shifting of the toggle is even greater in magnitude than that between the box and pin. The box-pin-dog combination therefore provides mechanical advantage in magnifying the force applied by the toggle for preloading the connections between the box, the pin, and the dog.

Toggle 42 provides an additional mechanical advantage in that a downward force exerted by the piston will cause a shifting force on the dog towards the hub of greater magnitude than the force of the piston. Hence the combined mechanical advantages of the toggle and the box-pin-dog combination will enable a relatively small force exerted on the piston by the hydraulic power supply to produce a tremendous preloading force connecting the box and the pin. For a given range of preloading forces required, use of the box-pin-dog combination thus reduces the power required of the hydraulic power supply and consequently the operating pressure in hydraulic lines 102. The probability of rupture of the hydraulic lines is thus also reduced.

From the above description, it will be seen that the purposes of this invention are accomplished. The use of the box-pin-dog combination as described reduces the magnitude of the forces on the components of the toggle and provides an improved mechanical advantage for preloading the connection between the box and the pin. The riser connector of this invention has the further advantage that the locking and releasing of the connection between the box and the pin as well as preloading of the connection are accomplished by a single mechanism, which simplifies the operation of the riser connector. This may be important if the connector is used at great depths or if a large number of connectors are used.

The above description of structure used is merely illustrative thereof and various changes and shapes, sizes or other details of the construction may be made within the scope of the appended claims without departing from the spirit of the invention. For example, the box and pin are not necessary if the ends of the two riser pipes to be connected are of the shapes of the box and pin. Then, the toggle, the locking dog and the piston-cylinder hydraulic system will function in the same manner as described above to connect the two riser pipes. The box and the pin need not be of the shapes shown so long as their functions described above are accomplished. For example, the box need not contain a chamber, and the toggle and toggle control mechanism may be housed in a chamber in the pin or in a separate housing attached to the box or the pin. The box and the pin need not be cylindrical, and more than one set of box and pin may be used to connect the ends of two pipes. The positions of the box and pin may also be reversed from those described. The locking dogs need not be cylindrical. It will be evident that the present invention applies even if the axes of the pipes are not oriented vertically. It will also be understood that means for applying forces to the dog other than the toggle and the toggle control mechanism described herein may be used and are also within the scope of the claims.

What is claimed is:

1. A riser connector for connecting a first riser pipe and a second riser pipe, said first riser pipe and said second riser pipe being placed so that they have substantially a common central longitudinal axis, said riser connector comprising:
    a connector box adapted to be attached to one end of the first riser pipe, said box having an abutment surface and said box defining a channel adjacent to the abutment surface, said channel having an axis oriented at a selected angle to the common axis of the pipes when the box is attached to the first pipe;
    a locking dog adapted to fit slidably into the channel of the box, said dog having a tapered surface at a wedge angle to the axis of the channel greater then 0° but less than 45°, said surface facing the abutment surface of the box when the dog is in the channel;
    a toggle connected directly to the box and the locking dog in such manner that expansion of the toggle urges the dog towards the locking position and contraction of the toggle tends to withdraw the dog from the locking position;
    a hollow cylinder;
    a piston adapted to fit sealingly and slidably in the space within the hollow cylinder, said piston being connected to the toggle so that movement of the piston in the cylinder in a first direction will expand the toggle and movement of the piston in a second direction opposite said first direction will contract the toggle;
    restraining means for preventing movement of said piston in said first direction which would contract the toggle;
    hydraulic means for moving the piston in said first direction in the cylinder and in said second direction in the cylinder; and
    a connector pin adapted to be attached to one end of the second riser pipe, said pin having a hub for engaging the box and the dog, so that when the toggle applies a force to the dog in the channel of the box pushing the dog towards the hub into a locking position, the hub is held between the abutment surface of the box and the tapered surface of the dog, and the connections between the box, the pin, and the dog are preloaded by forces greater in magnitude than the force applied to the dog by the toggle, and when the toggle applies a force to withdraw the dog from the locking position, the hub is released from the box.

2. The riser connector of claim 1, wherein for a given angle between the axis of the channel and a surface normal to the common axis of the riser pipes, the wedge angle is selected to be of such value that the axial preloading force connecting the pin to the box exceeds the force applied to the dog pushing it towards the hub.

3. The riser connector of claim 1, wherein the channel of the box is substantially normal to the common axis of the riser pipes.

4. The riser connector of claim 3, wherein the wedge angle is selected to be of such value that the axial preloading force connecting the pin to the box exceeds the force applied to the dog pushing it towards the hub.

5. The riser connector of claim 1, wherein the connector box has an internal chamber adjacent to the channel and suitable for housing the toggle and the hollow cylinder, said chamber being enclosed entirely by the box except that it communicates with the channel of the box.

6. The riser connector of claim 5, wherein said restraining means comprises a protruding portion of the wall of the chamber located in the path of expansion of the toggle.

7. The riser connector of claim 5, further comprising an O-ring between the contacting surfaces of the dog and the channel for sealing the chamber.

8. The riser connector of claim 1, further comprising a spring connected to the box and the toggle for urging the toggle to expand so that the box and the pin will remain connected when said means for expanding and contracting the toggle fails.

9. The riser connector of claim 1, wherein the connector box has two flanges adjacent to the abutment surface of the box so that the space enclosed by the flanges and the abutment surface forms a recess of the box, and wherein the hub of the connector pin is enlarged and fits into the recess of the box so that when the dog is in the locking position, a portion of the hub is larger than the space between the dog and one of the two flanges of the box thereby locking the hub of the pin into the recess of the box.

10. The riser connector of claim 1, wherein said channel of the connector box is cylindrical.

* * * * *